Figure 1:
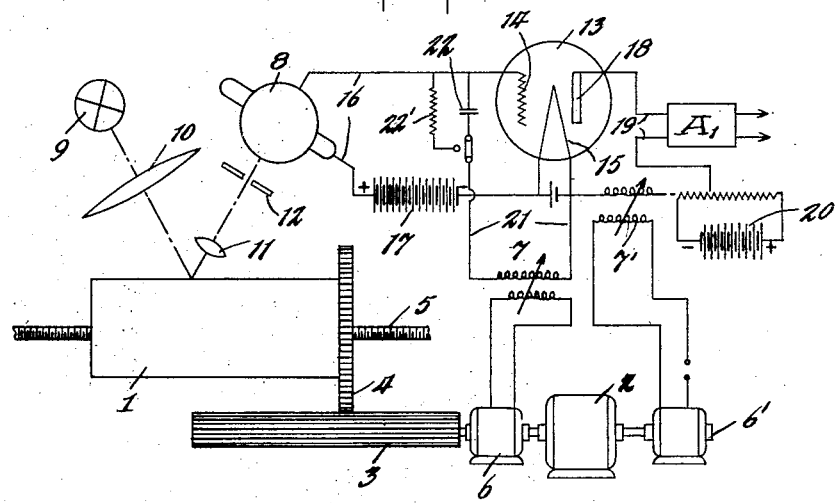

Aug. 25, 1936.    A. G. COOLEY    2,052,383
SYNCHRONIZING APPARATUS FOR PHOTOTELEGRAPHY

Original Filed Dec. 11, 1924

INVENTOR
AUSTIN G. COOLEY
BY *Darby & Darby*
ATTORNEY

Patented Aug. 25, 1936

2,052,383

UNITED STATES PATENT OFFICE 2,052,383

SYNCHRONIZING APPARATUS FOR PHOTOTELEGRAPHY

Austin G. Cooley, New York, N. Y., assignor, by mesne assignments, to Radio Corporation of America, a corporation of Delaware Original application December 11, 1924, Serial No. 755,336. Patent No. 2,015,742, dated October 1, 1935. Divided and this application March 11, 1931, Serial No. 521,665

11 Claims. (Cl. 178—6)

This invention relates to photo-telegraphic apparatus of the type wherein the light values of the subject matter affect the transmitted power so that the light values are reproduced at the receiving station in corresponding time and space relation, and particularly to apparatus for synchronizing the transmitting and receiving units such as, for example, rotating carriers for the photographic or printed matter to be transmitted and received.

In one aspect the invention comprises apparatus for sending with alternating or other varying current, the transmitter being driven at a rate proportional to a power frequency, the subject-matter being transmitted by varying the amplitude of the aforesaid current or power; and apparatus for operating the receiver apparatus at a speed proportional to the frequency of said current or power together with means for applying driving forces to the receiver independently of the transmitted power.

In a more specific aspect the invention comprises apparatus for sending with alternating or other pulsating current, the transmitting carrier or transmitter being driven by the source of the current energy or otherwise at a rate proportional to the frequency of the current and the subject-matter being transmitted by varying the pulsating current, apparatus for driving the receiving carrier or receiver at a speed proportional to said frequency and therefore in synchronism with the transmitting carrier, another means for applying driving force to the receiver independently of the pulsating transmitting current, and regulating means responsive to the impulses of said pulsating current for synchronizing the receivers with the current frequency and therefore with the transmitter. Said motive means, which may be an electric motor or other motor, preferably applies to the receiving carrier an approximately constant driving force sufficient to overcome its average resistance, and said regulating means therefore requires only a small amount of energy to synchronize the carrier. When the regulating means is in the form of a coil inductively associated with the rotor of said motor or with an associated rotor it functions as motive means to apply advancing force when the receiver tends to lag and to apply retarding force when the receiver tends to move too fast, the coil deriving its energy from said pulsating transmitting current or current controlled thereby.

For the purpose of illustration one concrete embodiment of the genus of the invention is shown diagrammatically in the accompanying drawing in which—

Fig. 1 indicates the transmitting apparatus; and

Figure 2:
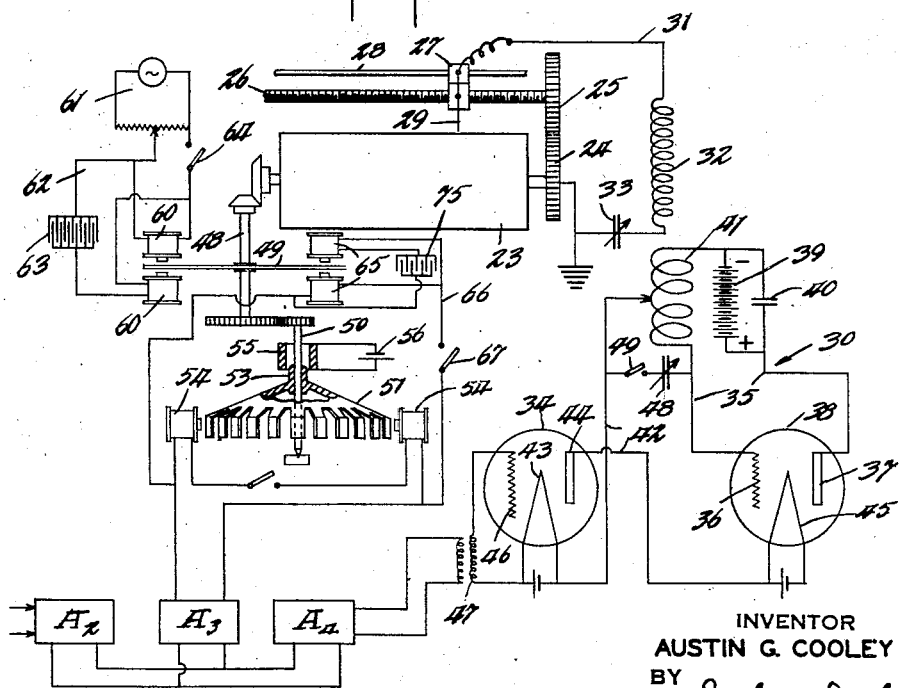

Fig. 2 indicates the receiving apparatus.

In the particular embodiment of the invention chosen for the purpose of illustration the transmitting apparatus comprises a drum 1 upon which the photograph, printed matter or the like, is wrapped, a motor 2 for rotating the drum through gears 3 and 4, the drum threading axially on a stationary shaft 5 as it rotates, a generator 6 for supplying alternating current to variable transformer 7 at a suitable frequency (say 1000 cycles or higher) which is proportional to the speed of drum 1, a photo-electric cell 8, a light source 9, lenses 10 and 11 for focusing upon said cell through apertured plate 12 a pencil of light reflected from the photograph or the like, an audion 13 having its grid 14 and cathode 15 connected to said cell through an input circuit 16 containing a source of potential 17, and having its cathode and anode 18 connected to an output circuit 19 containing a variable source 20, and an amplifier A1 interposed in the output circuit. This amplifier, as well as the amplifiers hereinafter referred to, may be of audion or other suitable type. The transformer 7 is connected across the input circuit 16 by circuit 21 containing a low capacity (e. g. 0.00001 mf) condenser 22, or high resistance 22', (e. g. of the order of five to twenty-five megohms, preferably the latter, depending on the type of audion, etc.)

The receiving apparatus shown in Fig. 2 comprises a drum 23 which rotates without endwise progression, this drum carrying sensitized paper or other suitable recording media. Connected to the drum through gears 24 and 25 is a threaded shaft 26 along which travels a head 27, the head having an opening to receive stationary rod 28 which restrains the head from turning with the shaft. Head 27 carries a needle 29 for directing an electronic discharge to the sheet wound on drum 23. This discharge is produced by an oscillating circuit 30 feeding into circuit 31 containing coil 32 and condenser 33, the oscillating circuit being controlled by the aforesaid transmitting station working through amplifiers A2 and A4 and a modulator 34.

The oscillator comprises a circuit 35 connected to the grid 36 and anode 37 of audion 38 and containing battery 39, condenser 40 and coil 41, the latter being inductively associated with coil 32. The output circuit 42 from the cathode 43 and anode 44 of modulator 34 is connected between the coil 41 and cathode 45 of audion 36, the grid 46 of the modulator being connected to amplifier A4, through transformer 47. A condenser 48 may be connected in the circuits by switch 49 but is ordinarily not required.

Geared to the drum 23 is a shaft 48 carrying a conducting disk 49 and geared to shaft 48 is a shaft 50 carrying a conical rotor 51 of paramagnetic material, the rotor having peripheral poles 52 and an axial stem 53 fast to shaft 50. Stationary coils 54 and 55 are associated with the poles 52 and stem 53 respectively, the coil 55 being energized by battery 56 to polarize poles 52 and also to pull upwardly on stem 53 thereby to cause the shaft 50 to rest lightly on bearing 57. The coils 54 are connected to amplifier A3 through circuit 58 containing switch 59. Associated with disk 49 are electro-magnets 60 connected to a variable source of alternating current 61 through circuit 62 containing condenser 63 to throw magnets 60 out of phase with each other and switch 64. The circuit 58 may also be connected to electro-magnets associated with disk 49 and in the drawing this circuit is connected to electro-magnets 65 other than magnets 60 through circuit 66 containing switch 67, a condenser 75 being connected in series with one of the electro-magnets 65 to produce the necessary phase displacement.

In transmitting, motor 2 drives the drum 1 at a speed proportional to the frequency of the alternating current from generator 6 and the light from source 9 traces a spiral around the periphery of the drum as the latter is threaded along shaft 5. The alternating current from generator 6, acting upon the grid of audion 13, causes pulsations of impulses to be transmitted from the transmitting station to the receiving station, either by wire or by radio. The light reflected from the subject-matter on drum 1 to the photo-electric cell varies the resistance of circuit 16 in accordance with variations in the reflection ability of the successive points of the subject-matter. This variation of resistance in circuit 16 varies the potential on grid 14 and thereby varies the aforesaid impulses.

It has been found that by varying the potential of battery 20 either like or opposite reproduction can be effected, that is, either a positive or a negative can be produced at the receiving station when using a negative (or a positive) at the transmitting station. For example, like reproduction has been attained with twenty volts and opposite reproduction with ten volts. This is due to the fact that under the respective conditions opposite effects are produced by the pulsating potential impressed upon grid 14 by transformer 7 when the plate potential is varied. A theory explanatory of this mode of operation is set forth in copending application Serial No. 755,337, filed on even date herewith, in which application this method of like or opposite reproduction is claimed.

At the receiving station said varying impulses vary the potential on grid 46 thereby varying the effective resistance of circuit 42 and varying the intensity of the oscillations in circuit 30. When no impulse is acting upon grid 46 the resistance of the modulator is sufficient to prevent oscillations or at least render the oscillations so feeble as to be ineffective. When an impulse is acting upon grid 46 the resistance is lowered sufficiently to permit oscillations, the intensity of the oscillations being proportional to the intensity of the impulse. The oscillating circuit 30 is preferably adjusted to generate oscillations of high-frequency and high-potential adapted to produce an electronic discharge (e. g. a corona discharge) from needle 29 when above a predetermined intensity higher than that existing between successive impulses, the intensity of the discharge depending upon the excess of oscillation intensity above the predetermined intensity, whereby an electronic discharge is emitted from needle 29 during each impulse (except perhaps while recording a white or an extremely light representation on the receiving paper). Thus, in transmitting a half-tone, a dot (or short dash) is recorded on the receiving paper at each impulse, the dot varying in intensity in response to variations in the intensity of said impulses, and in transmitting extreme contrasts such as the black and white of printed matter, at each impulse during passage of black or white (depending upon the adjustment of the transmitting apparatus as above described) past the point of incidence of the light from source 9.

The recording paper may be of the type requiring development subsequent to exposure by the electronic discharge to convert the latent image into a patent image or it may be of the type in which a patent image is produced without development, the latter type having the advantage of displaying the image as it is recorded. The electronic discharge produces the exposure as a result of its light and/or heat and/or electronic bombardment of the photographic emulsion.

The receiving drum 23 is driven at approximately the speed of the transmitting drum 1 by the eddy-current motor comprising disk 49, the current in coils 60 being adjusted to such quantity and phase relation as to overcome the average resistance of the parts driven thereby, and the aforesaid impulses of current synchronize the drum 23 with drum 1 by recurrently energizing magnets 54 at the frequency of the transmitting current. The poles 52 are so distributed that one pole passes each magnet 54 during each impulse. If the motor 49 is driving the drum 23 at synchronous speed the alternate advancing and retarding effects of the magnets 54 cancel, whereas if motor 49 tends to drive drum 23 too slow or too fast either the advancing or the retarding effect of magnets 54 predominates to maintain the drum in synchronism.

By closing switch 67 power is supplied to motor 49 in proportion to the intensity of the transmitting impulses, and the power of the eddy-current motor is thereby varied in accordance with the current synchronous motor 51—54, thus more effectively holding the drum in synchronism during wide variations in the intensity of the transmitting impulses.

While I have shown for purposes of illustration, a system in which the subject-matter is sent by modulating the synchronizing pulsations it will be understood that in its broader aspect the present invention is independent of whether or not the subject-matter is transmitted by modulating these pulsations or other pulsations. For example, a second generator 6' may be connected with the plate circuit 19 through transformer 7' for producing synchronizing pulsations of different frequency, in which case the receiving apparatus is adjusted to respond to these pulsations and the pulsations produced by generator 6 have no effect upon the synchronizing apparatus owing to their different frequency. It will also be understood that this invention is applicable to multiplex systems wherein a plurality of images or signals are sent simultaneously by modulating different pulsations of different frequencies and/or heat frequencies according to the different subject-matter respectively.

This application is a division of application Serial No. 755,336, filed December 11, 1924.

What is claimed is:

1. Scanning apparatus for television and the like, comprising means for producing a luminous point electrical recording discharge of relatively high frequency currents, means for causing travel of said discharge in a predetermined scanning pattern, and means for modulating said high frequency currents to control the luminous intensity of said discharge.

2. The method of scanning for television and the like, which comprises producing a self-luminous illuminating point electrical recording discharge by passing relatively high frequency currents between a pair of spaced and relatively moving electrode systems, and modulating said high frequency currents to control the luminous intensity of said discharge.

3. The method of scanning for television and the like, which comprises producing a self-luminous point electrical recording discharge by passing relatively high frequency currents between a pair of the relatively moving electrode systems, producing travel of said discharge in a predetermined path at a predetermined speed, and modulating said high frequency currents to control the luminous intensity of said discharge.

4. In an image transmission system the combination of means for transmitting a carrier wave modulated according to shade characteristics of the image, the frequency of said carrier wave being suitable for synchronizing a reproducing light source at the receiver, means at the receiver for changing the received modulated carrier wave into a similarly modulated high frequency wave for energizing said light source, and means for applying a portion of the received carrier wave to synchronize the receiver with the transmitter.

5. A device for reproducing a visual image comprising a pair of spaced electrodes, one of said electrodes being in the form of a needle point, means for impressing a sustained high frequency wave across said electrodes to produce a discharge at said needle point electrode, and means including a vacuum tube modulator for modulating the amplitude of said high frequency waves under control of received image currents.

6. A device according to claim 5 in which the needle point electrode is movable relatively to the other electrode.

7. In a system of the character described, the combination of a needle point electrode adapted to have a discharge produced thereon, means for moving a recording surface with relation to said needle point electrode, a vacuum tube oscillator for generating sustained high frequency waves, means for impressing the output of said oscillator on said needle point electrode, means to receive image currents, and a vacuum tube modulator for modulating the output of said oscillator under control of the received currents.

8. A system according to claim 7 in which the recording medium is of the type adapted to have the image produced thereon without development under control of the discharge from said needle point electrode.

9. A system of the character described comprising a pair of spaced electrodes, one of which is in the form of a needle point, an image recording surface positioned between said electrodes, means for producing relative movement between said needle point electrode and said recording surface, a vacuum tube oscillator for generating a sustained high frequency wave, means for impressing said wave on said needle point electrode, a vacuum tube modulator for said oscillator, and means for impressing received image currents upon said oscillator-modulator to correspondingly vary the discharge between said electrodes.

10. A system according to claim 9 in which the needle point electrode is moved transversely across said recording surface.

11. An image producing system comprising a source of carrier current at a receiving station, means at said station for modulating current from said source in accordance with the received image impulses, and light producing means controlled by said modulated current.

AUSTIN G. COOLEY.